United States Patent [19]

Nakatani et al.

[11] 4,325,441
[45] Apr. 20, 1982

[54] ERROR ALARM SYSTEM IN A COMBINED ELECTRONIC WEIGHING SCALE AND ELECTRONIC CASH REGISTER

[75] Inventors: Hiroshi Nakatani; Masahide Ishida, both of Yamatokoriyama; Hachizou Yamamoto, Nara, all of Japan

[73] Assignee: Sharp Kabushiki Kaisha, Osaka, Japan

[21] Appl. No.: 147,271

[22] Filed: May 6, 1980

[30] Foreign Application Priority Data

May 7, 1979 [JP] Japan .................................. 54-56125

[51] Int. Cl.³ ..................... G01G 23/22; G01G 23/18; G01G 23/00
[52] U.S. Cl. ....................................... 177/25; 177/45; 177/245
[58] Field of Search ...................... 177/1, 25, 45, 245, 177/DIG. 1, DIG. 3; 364/567, 568

[56] References Cited

U.S. PATENT DOCUMENTS 3,906,208 9/1975 Rogers ............................. 364/567 X
3,921,736 11/1975 Rogers ........................... 177/DIG. 3

FOREIGN PATENT DOCUMENTS 2027912 2/1980 United Kingdom .................. 177/25

Primary Examiner—George H. Miller, Jr.
Attorney, Agent, or Firm—Birch, Stewart, Kolasch and Birch

[57] ABSTRACT

An electronic cash register electrically communicates with an electronic weighing scale. An interface circuit is included in the electronic cash register for introducing weight information data from the electronic weighing scale into the electronic cash register. An abnormal condition detection system is included in the electronic cash register for detecting an abnormal condition occurring within the electronic weighing scale. The electronic cash register includes a synthetic speech sound generation system for audibly informing an operator of the abnormal condition detected by the abnormal condition detection system.

13 Claims, 3 Drawing Figures

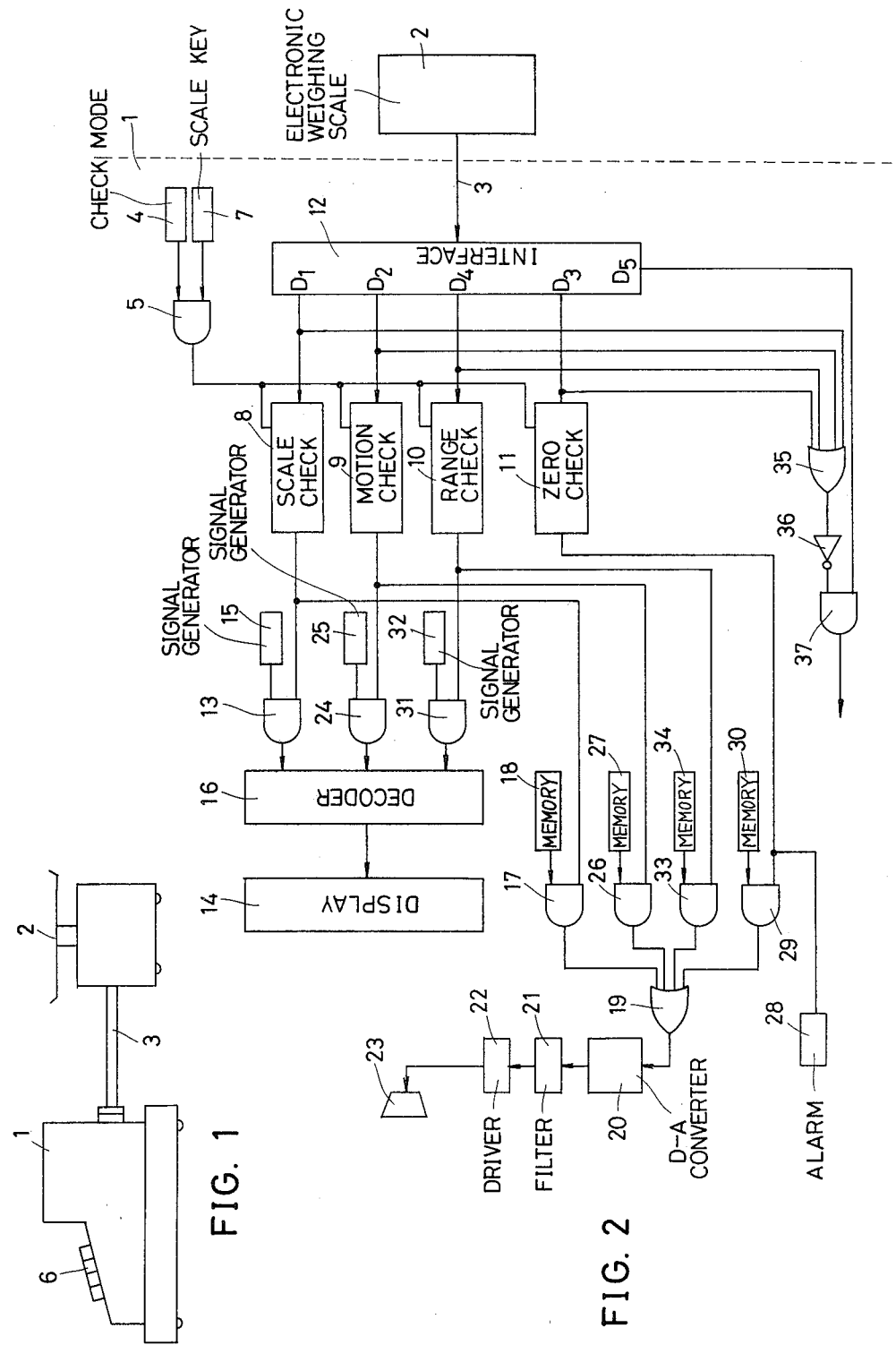

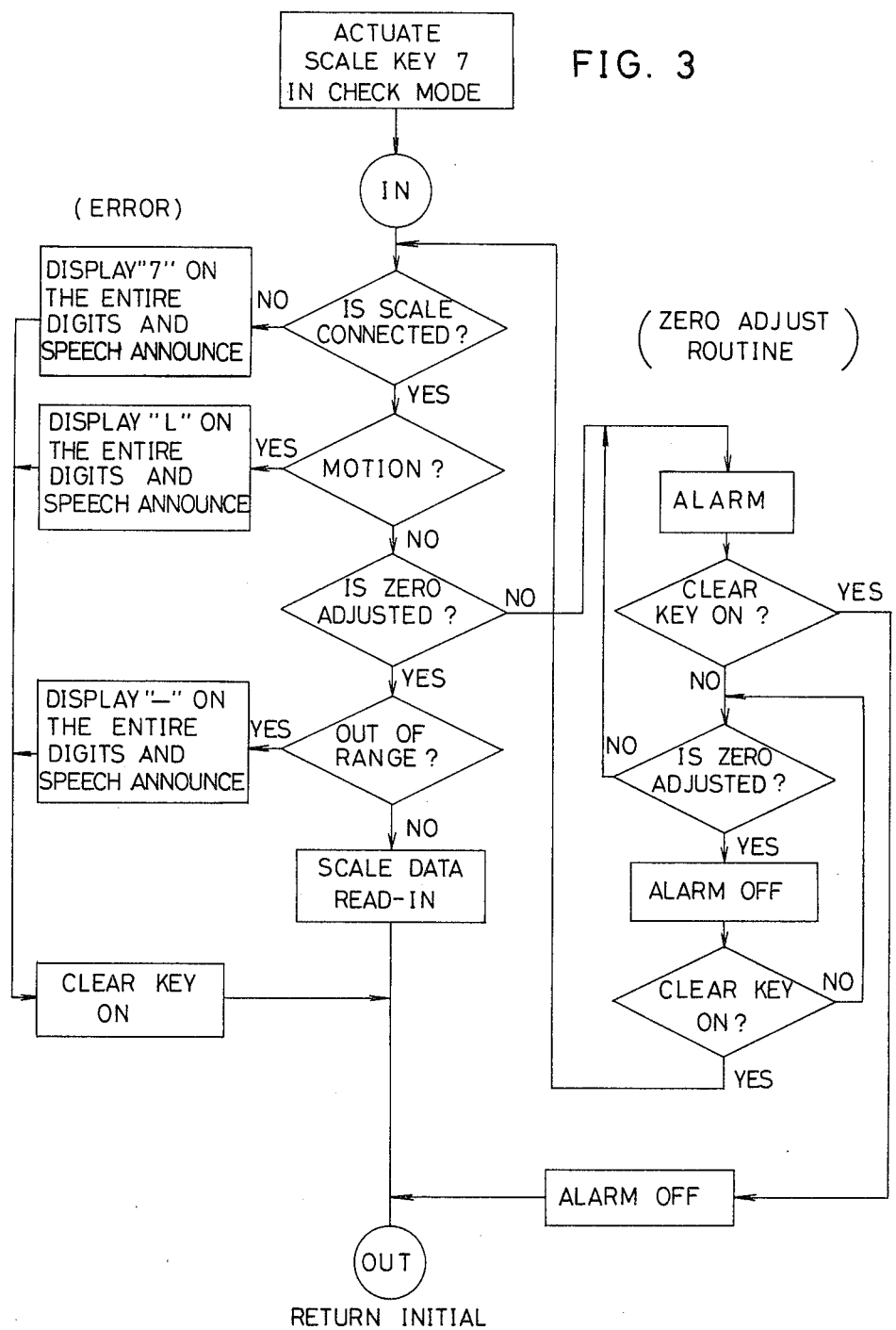

ERROR ALARM SYSTEM IN A COMBINED ELECTRONIC WEIGHING SCALE AND ELECTRONIC CASH REGISTER

BACKGROUND AND SUMMARY OF THE INVENTION

The present invention relates to an electronic cash register and, more particularly, to a combination system wherein a peripheral system such as an electronic weighing scale is electrically connected to an electronic cash register.

Recently, a combination system has been proposed, wherein a peripheral machine such as an electronic weighing scale and an electronic coin dispenser is electrically connected to an electronic cash register. In a combined electronic weighing scale and an electronic cash register, weight information data is applied from the electronic weighing scale to the electronic cash register, and the electronic cash register calculates the amount through the use of the weight information data applied from the electronic weighing scale and price information per unit weight which has been previously set in the electronic cash register or which is introduced through a keyboard unit of the electronic cash register.

Since the total amount calculation is automatically performed, the electronic weighing scale, the electronic cash register and the interface circuit therebetween must operate accurately.

Accordingly, an object of the present invention is to enhance the reliability of a combination system of an electronic cash register and a peripheral machine such as an electronic weighing scale.

Another object of the present invention is to provide a check system for detecting an abnormal condition in a combined electronic cash register and electronic weighing scale.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic cash register includes a check system for detecting an abnormal condition of an electronic peripheral machine such as an electronic weighing scale, which is electrically connected to the electronic cash register. When an abnormal condition is detected in the electronic peripheral machine or in an interface circuit positioned between the electronic cash register and the electronic peripheral machine, the abnormal condition is audibly alarmed by the electronic cash register through the use of a synthetic speech sound generation system included in the electronic cash register.

In the case of a combined electronic cash register and electronic weighing scale, the electronic cash register includes a check system for detecting whether the electronic weighing scale is accurately connected to the electronic cash register, whether a weighing platform of the electronic weighing scale is still fluctuating, whether the zero adjustment is achieved, and whether an article to be measured is within the weighing range. A suitable, audible alarm is developed by the electronic cash register in response to the detection results. An abnormal detection result is also displayed on a digital display unit included in the electronic cash register.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a schematic front view of an embodiment of a combined electronic cash register and electronic weighing scale of the present invention;

FIG. 2 is a block diagram of an essential part of the combined electronic cash register and electronic weighing scale of FIG. 1; and FIG. 3 is a flow chart for explaining the operation mode of the circuit of FIG. 2.

DESCRIPTION OF THE PREFERRED EMBODIMENTS

An electronic cash register 1 and an electronic weighing scale 2 are electrically communicated with each other via a cable line 3 as shown in FIG. 1.

The check operation of the present invention will be described with reference to FIGS. 2 and 3.

The electronic cash register 1 includes a mode selection switch 4 for selecting a desired operation mode within the normal registration mode, the preset mode, the check mode, etc. First, the mode selection switch 4 is placed at the check mode. At this moment, a high level signal is applied to one input terminal of an AND gate 5. Under these conditions, when a scale key 7 included in a keyboard unit 6 is actuated, a high level signal is applied to the other input terminal of the AND gate 5 which develops a high level signal for initiating the checking operation.

The high level signal derived from the AND gate 5 enables a scale check unit 8 for detecting whether the electronic weighing scale 2 is electrically connected to the electronic cash register 1, a motion check unit 9 for detecting whether the weighing platform of the electronic weighing scale 2 is stable or fluctuating, a range check unit 10 for detecting whether the weight value is within the normal range of the electronic weighing scale 2, and a zero-adjustment check unit 11 for detecting whether the zero adjustment is achieved.

First, the check operation is conducted by the scale check unit 8. When the electronic weighing scale 2 is electrically connected to the electronic cash register 1 in the normal manner, an interface 12 develops a low level signal at a first output terminal $D_1$, whereby the scale check unit 8 develops a low level signal which disables an AND gate 13. If the electronic weighing scale 2 is not electrically connected to the electronic cash register 1, the first output terminal $D_1$ of the interface 12 develops a high level signal, whereby the scale check unit 8 develops a high level signal to enable the AND gate 13. The AND gate 13 functions to pass a display signal stored in a signal generator 15 toward a decoder 16. The signal generator 15 stores the display signal for displaying "7" on all of the digits of a digital display unit 14, thereby alarming an abnormal condition.

The high level signal derived from the scale check unit 8 further enables an AND gate 17, which passes synthetic speech data stored in a memory 18 toward an OR gate 19. The memory 18 stores the synthetic speech data for audibly announcing the erroneous electrical connection between the electronic cash register 1 and the electronic weighing scale 2. The synthetic speech data derived from the OR gate 19 is applied to a digital-to-analog converter 20. The analog signal developed from the digital-to-analog converter 20 is applied to a speaker driver circuit 22 through a low-pass filter 21, whereby a speaker system 23 develops a synthetic speech sound of, for example, "SCALE" to audibly inform the operator of the erroneous electrical connection between the electronic cash register 1 and the electronic weighing scale 2.

If the electronic weighing scale 2 is correctly connected to the electronic cash register 1, the program is advanced to the following step as shown in FIG. 3. When the weighing platform of the electronic weighing scale 2 is held stationary, a second output terminal $D_2$ of the interface 12 bears the logic low. If the weighing platform is fluctuating, the second output terminal $D_2$ of the interface 12 develops a high level signal, whereby the motion check unit 9 develops a high level signal to turn on an AND gate 24. At this moment a display signal stored in a signal generator 25 is applied to the decoder 16. The signal generator 25 stores the display signal for displaying "L" on all of the digits of the digital display unit 14, thereby providing an alarm of the fluxuation of the weighing platform.

The high level signal derived from the motion check unit 9 is further applied to an AND gate 26 to turn on the AND gate 26. The AND gate 26 functions to pass a synthetic speech data stored in a memory 27. The memory 27 stores the synthetic speech data for audibly announcing the fluctuation of the weighing platform of the electronic weighing scale 2. In this way, the speaker system 23 provides a synthetic speech sound of, for example, "MOTION", thereby audibly indicating the fluctuation.

If the electronic weighing scale 2 is electrically connected to the electronic cash register 1, and the weighing platform is held stationary, the program is advanced to the following zero adjustment check operation. When the zero adjustment is accurately performed, a third output terminal $D_3$ of the interface 12 develops a low level signal, whereby the zero-adjustment check unit 11 develops a low level signal.

If the zero adjustment is not achieved, the third output terminal $D_3$ develops a high level signal. In response thereto, the zero-adjustment check unit 11 develops a high level signal to turn on an AND gate 29 which functions to pass synthetic speech data stored in a memory 30.

The memory 30 stores the synthetic speech data for audibly informing the operator of the undesirable zero adjustment. In this way, the speaker system 23 provides the synthetic speech of, for example, "ZERO CENTER". The high level signal derived from the zero-adjustment check unit 11 further enables an alarm display unit 28. The alarm display unit 28 can be a light emitting element which is driven to flicker in response to the high level signal derived from the zero-adjustment check unit 11.

When the "ZERO CENTER" synthetic speech is provided, and the alarm display unit 28 is enabled, the operator must perform the zero adjustment of the electronic weighing scale 2. FIG. 3 shows the zero adjustment routine in detail.

If the zero adjustment is achieved correctly, the alarm display is disabled. Then, the operator actuates the clear key disposed on the keyboard panel 6 to return the program to the initial condition of the checking operation. That is, the scale connection check, the fluctuation check and the zero adjustment check are performed once more. If the zero adjustment has never been achieved, the alarm display is continuously enabled. At this moment, the operator must actuate the clear key to terminate the checking operation, thereby disabling the alarm display. The electronic weighing scale must be exchanged to the normal one.

When the electronic weighing scale 2 is electrically connected to the electronic cash register 1, the weighing platform is held stationary, and the zero adjustment is correctly achieved, the combined electronic cash register and weighing scale is placed in the standby condition. The article to be scaled is put on the weighing platform of the electronic weighing scale.

If the article is within the weighing range of the electronic weighing scale 2, a fourth output terminal $D_4$ of the interface 12 develops a low level signal. If the article is not within the weighing range of the electronic weighing scale 2, a high level signal is developed from the fourth output terminal $D_4$ of the interface 12, whereby the range check unit 10 develops a high level signal to enable AND gates 31 and 33. The AND gate 31 functions to pass a display signal stored in a signal generator 32. The display signal stored in the signal generator 32 is to display "-" on all of the digits of the digital display unit 14 for alarming the abnormal condition. The AND gate 33 functions to pass synthetic speech data stored in a memory 34. The memory 34 stores the synthetic speech data for audibly announcing the over-range of the article. Accordingly, the speaker system 23 develops the synthetic speech sound of, for example, "OUT OF RANGE".

In the normal mode of operation, the first through fourth output terminals $D_1$, $D_2$, $D_3$ and $D_4$ of the interface 12 develop the low level signals, which are applied to an OR gate 35. An output signal of the OR gate 35 is applied to an inverter 36. Accordingly, the inverter 36 develops a high level signal, in the normal mode of operation, which is applied to one input terminal of an AND gate 37. The other input terminal of the AND gate 37 receives a weight information data derived from a fifth output terminal $D_5$ of the interface 12. The thus obtained weight information data derived from the AND gate 37 is introduced into a central processor unit (CPU) of the electronic cash register 1.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A combined electronic cash register and weighing scale comprising:
   an electronic cash register;
   an electronic weighing scale for developing weight information data for the electronic cash register, said electronic cash register including,
   an interface circuit for receiving said weight information data from said electronic weighing scale and developing an output signal in response thereto;

detection system means responsive to the output signal from said interface circuit for detecting an abnormal condition occurring within said electronic weighing scale and developing a detection output in response thereto; and an announce system responsive to said detection output for audibly announcing the abnormal condition of said electronic weighing scale in response thereto.

2. The combined electronic cash register and weighing scale of claim 1, wherein said detection system means comprises:

a first detection system means for detecting whether said electronic weighing scale is electrically connected to said electronic cash register, and developing a first detection output when said electronic weighing scale is not accurately connected to said electronic cash register.

3. The combined electronic cash register and weighing scale of claim 2, wherein said announce system audibly announces synthetic speech sound of "SCALE" in response to said first detection output.

4. The combined electronic cash register and weighing scale of claim 3 further comprising:

display means responsive to said first detection output for providing a display indication indicative of the inaccurate connection of said electronic weighing scale to said electronic cash register.

5. The combined electronic cash register and weighing scale of claim 1, wherein said detection system means comprises a second detection system means for detecting whether a weighing platform of said electronic weighing scale is stable or is fluctuating, and developing a second detection output when said weighing platform is fluctuating.

6. The combined electronic cash register and weighing scale of claim 5, wherein said announce system audibly announces a synthetic speech sound of "MOTION" in response to said second detection output.

7. The combined electronic cash register and weighing scale of claim 6 further comprising display means responsive to said second detection output for providing a display indication indicative of the fluxuating weighing platform.

8. The combined electronic cash register and weighing scale of claim 1, wherein said detection system means comprises:

a third detection system means for detecting whether a zero adjustment is achieved in said electronic weighing scale, and developing a third detection output when the zero adjustment is not achieved.

9. The combined electronic cash register and weighing scale of claim 8, wherein said announce system audibly announces a synthetic speech sound of "ZERO CENTER" in response to said third detection output.

10. The combined electronic cash register and weighing scale of claim 9 further comprising display means responsive to said third detection output for providing a display indication indicative of the fact that the zero adjustment has not been achieved.

11. The combined electronic cash register and weighing scale of claim 1, wherein said detection system means comprises:

a fourth detection system means for detecting whether an article to be measured by said electronic weighing scale is within a weighing range of said electronic weighing scale, and developing a fourth detection output when said article is not within the weighing range of said electronic weighing scale.

12. The combined electronic cash register and weighing scale of claim 11, wherein said announce system audibly provides a synthetic speech sound of "OUT OF RANGE" in response to said fourth detection output.

13. The combined electronic cash register and weighing scale of claim 12 further comprising display means responsive to said fourth detection output for providing a display indication indicative of the fact that said article is not within the weighing range of said electronic weighing scale.

* * * * *